Nov. 10, 1970     C. GREENFIELD     3,539,549
RECOVERY OF PROTEIN FROM BONE
Filed Feb. 27, 1969
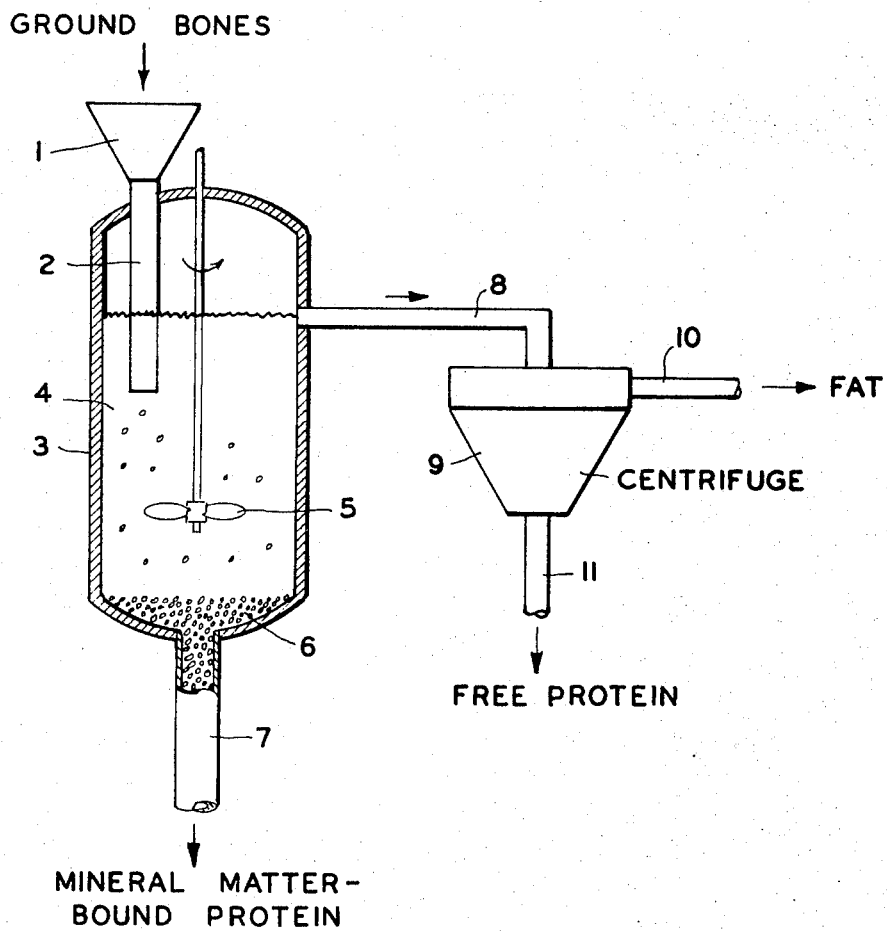
INVENTOR.
CHARLES GREENFIELD
BY
*Richard L. Cannaday*
ATTORNEY

United States Patent Office 3,539,549
Patented Nov. 10, 1970

---

3,539,549
RECOVERY OF PROTEIN FROM BONE
Charles Greenfield, 35 Walnut St.,
Murray Hill, N.J. 07971
Continuation-in-part of application Ser. No. 365,605, May 7, 1964, which is a continuation-in-part of application Ser. No. 174,986, Feb. 23, 1962, now Patent No. 3,134,795. This application Feb. 27, 1969, Ser. No. 803,038
Int. Cl. A23j 1/10
U.S. Cl. 260—112      5 Claims

ABSTRACT OF THE DISCLOSURE

A process and appaartus for recovering both free protein and mineral matter-bound protein from bone by agitating ground bones in a body of liquid fat to effect separation of free protein from the bone material; drawing off a liquid mixture of free protein and fat from the upper portion of the body of fat and then separating this mixture by means such as centrifuging, and drawing off mineral matter-bound protein from the lower portion of the body of fat toward which it has settled by gravity.

RELATED APPLICATIONS

The present application is a continuation-in-part of United States patent application Ser. No. 365,605, filed on May 7, 1964, and now abandoned. That application in turn was a continuation-in-part of United States patent application Ser. No. 174,986, filed on Feb. 23, 1962, and now United States Pat. No. 3,134,795, issued on May 26, 1964.

SUMMARY AND BACKGROUND OF THE INVENTION

This invention relates to improvements in the separation and recovery of valuable protein fractions contained in ground bone particles, as well as the recovery of proteins from attached meat of the pre-ground bones. More particularly, it relates to a process and apparatus wherein these fractions are separated and recovered by agitating ground bone particles dispersed in a liquid fat medium, and the novel protein fractions thus obtained.

The food industry has been active in attempting to recover protein fractions from the attached meat of bone. A good deal of effort has thus been expended, particularly in employing aqueous systems for the desired recovery. Inadequate separations have been obtained and losses have been excessive. Little attempt has been made to recover native protein from the bone particles themselves.

The native protein of bone or mineral matter-bound protein may not be freed by grinding alone. It is generally obtained according to the techniques of the prior art by acidification of the bone to release ossein with the ossein then being treated by liming and hot water extraction to give a gelatin or a glue product. Free protein, that is, protein of the kind present in meat attached to bones, is also present in bone material iself and may be freed therefrom by grinding. If protein freed from bones by grinding be present in large quantities along with mineral matter-bound protein in a gelatin product its general effect is to degrade this product. On the other hand, free protein becomes a valuable food product similar to meat when it is separated in a relatively pure form, and it may be used in meat formulations as well as in soup stock.

This invention provides an improved process and apparatus for separating and recovering valuable protein fractions, i.e., free protein and mineral matter-bound protein contained in ground bone particles. The method comprises agitating the ground bone feed dispersed in a liquid fat medium, and separating the lighter free protein fraction from the mineral matter-bound protein fraction. These materials are believed to be new products. In a preferred embodiment, the ground bone particles are injected into an agitated body of liquid fat in a continuous operation. The velocity of the agitated fat is sufficient to accomplish quantitatively the desired separation. Specific features are described below in further detail.

Bone is defined for the purpose of this invention as bone material that is essentially freed of attached meat and may contain cartilage, connective tissue, marrow, etc. The usual beef bone as coming from packing plants after trimming may or may not contain small amounts of attached meats. The bones employed as feed to the process may be animal, fish or fowl, and the products may be edible materials, i.e., fit for human consumption, or inedible materials, i.e., unfit for human consumption but usually fit for animal consumption, as defined by State and Federal Meat Inspection Groups. Most protein fractions, including the mineral matter-bound, fraction, when properly sterilized, may be used in the animal feed industry.

Typical bones thus are beef trimming bones, fish bones, chicken bones, etc. Also included are those bone materials containing attached meat such as bones incompletely trimmed and chicken necks and backs, etc., or chicken and turkey trimmed carcasses. The bones are ground to a size such that preferably at least 90 wt. percent have a particle size of less than about .015 cu. in. The grinding or comminuting can be accomplished by conventional means, e.g., employing a hammer mill, meat chopper, fine cutters, etc. The bone is preferably ground in the presence of a liquid fat medium as described in further detail in U.S. Pat. No. 2,911,421. This avoids undesirable heat build-up and cooking of the feed. Avoidance of cooking also results in retention of the free protein fiber length, avoiding production of fines and thus making separation easier.

The thus ground bone particles may optionally but preferably be subjected to a dehydration step such as by freeze-drying, or the process described in United States Pat. Nos. 2,911,421 and 3,076,715, which substantially avoid cooking or coagulation. The extent of dehydration when carried out is preferably to a maximum water content of 10 wt. percent on a fat-free basis. The liquid fat medium into which the ground bone is dispersed may be the same kind as that present in the bones, or it may be another fat satisfactory for the operation. Typical fats are beef tallow (edible grade), tallow (inedible grade), lard, white grease, lamb fat, chicken fat, turkey fat, etc. The amount of bone particles in the agitated fat is in the range of about one part of bones to 1 to 5 parts of fat, generally in the range of 2–3 parts of fat, all by weight, including fat from grinding. The temperature of this liquid fat during processing is in the range of about 100° to 300° F. This range is preferred but is not specifically critical.

The agitation velocity is determined by empiric methods and depends on the quantity relationships, size of the vessel, etc. Thus where the ground bone feed is injected into an agitated body of liquid fat, the velocity of the agitator is adjusted to obtain the lighter and heavier protein fractions. Depending on tank size, velocities of about 100 to 300 r.p.m. have been used with a turbine type agitator. The feed rate is controlled by the size of the vessel, e.g., 20–60 gals. per hour of feed mixture were fed to a 40 gal. vessel. Other separation means contemplated include cyclones, classifiers of many types, such as used in the metal separation and mineral industry, and others which lend themselves to the separation disclosed.

The mineral matter-bound protein matter discharging from the bottom of the tank will have adhering to it some oil and free protein matter. A second washing treatment with clean oil will essentially remove almost all of the free protein adhering to the mineral-bound protein matter. The mineral matter-bound protein as discharged from the secondary separation step or purification process contains some adhering fat, and this can be removed by centrifuging. The centrifuged product contains approximately 3–5% fat. The protein content of this material is approximately 25–30 wt. percent. The mineral matter can be removed from the protein in the conventional manner by acid treatment. A desirable treatment is with phosphoric acid of a maximum strength of 10%, combined with an additional grinding step. Alternatively, fine grinding with a controlled high temperature water treatment may be employed, particularly for gelatin production.

The free protein matter in the fatty tallow medium can then be centrifuged to obtain the free protein with a minimum of contaminant of mineral matter-bound protein. The centrifuging generally results in a product containing about 10–20% fat and about ½ to 20 wt. percent mineral matter-bound protein, i.e., substantially all of the latter materials not settled out in the separation tank. The flexibility of this operation is such that the products can be tailored to meet desired specifications. Usually in the manufacture of edible products it is desirable to reduce the mineral matter-bound protein content in the free protein product to a minimum value. In the inedible rendering industry, the free protein product can contain any desirable quantity of mineral matter-bound protein which offers the best combination for the market.

If it be desired to further remove the mineral matter-bound protein matter from free protein, the free protein slurry coming from the separation tank can be passed over a fine mesh screen, such as vibrating screens used in industry, so that the very fine mineral matter is flushed through with the oil; whereas the protein fibers are retained on the screen. A certain amount of small particles or fines of free protein will pass along with the fine residual matter through the screen. If desired to maintain a complete yield of protein, it is possible to separate these fine proteins from the mineral matter by gravity separation; in fact, since these particles are of the same order of size as the mineral matter-bound protein particles, the separation can be made by numerous techniques that are commonly used in industry; or it can be repeated by the gravity technique described above.

An additional technique that can be used with the drying procedure, for example of U.S. Pats. Nos. 2,911,421, 3,076,715 and Re. 25,322, is to return the fine proteins with the fine bone matter passing through the screen to the evaporator and thereby build up the particle size of the protein fines. In this manner the amount of protein fines passing through the screen in the subsequent operation would reach equilibrium and not become a large fraction of the total product. It is important that the proteins be uncoagulated so that the adhesion of small particles to each other can take place readily by the wetting operation. Any build-up of the mineral matter-bound protein in the fine state can be purged conveniently from the system when its concentration has increased.

The dry free protein product is a soft, matty material which typically is recovered from bone in yields of about 30 to 70% of the protein content of the bone, depending on the histological and chemical composition of the bone. The material has a brown meat-looking color, and when freshly prepared has a pink hue. The material when eaten cooked contains practically all of the flavor constituents of the bone. This had not previously been recognized and usually protein recovery systems resulted in obtaining mixtures of free and bound protein in the cooked or hydrolyzed state (soluble protein), either as soup stocks or gelatin. Cooking of the protein during recovery had further contributed to degradation of flavor or reduction in yield of the protein based on the original content in the raw material.

The heavier mineral matter-bound protein also may be utilized as described below. It must be recognized, in view of the difficulties of otherwise characterizing the proteins so recovered, that all reference to them herein connotes the materials recovered from bone in the indicated manner.

BRIEF DESCRIPTION OF THE DRAWING

The invention will be better understood by reference to the following example and the flow diagram shown in the drawing, this diagram depicting the essential apparatus elements of the invention and indicating the process steps thereof.

DETAILED DESCRIPTION OF THE DRAWING

Referring now to the drawing in detail, dehydrated, raw, ground beef bone particles of about ⅛-inch average maximum dimension in a concentration of about 28 wt. percent in liquid beef tallow are dumped from storage hopper 1 through chute 2 into tank 3. The tank has a body of liquid tallow fat 4 at a temperature of 150° F. Agitator 5 at a velocity of 130 r.p.m. maintains the evolved free protein fibers suspended in the liquid tallow, whereas the mineral matter-bound proteins settle toward the bottom of the tank. The bound protein-containing fraction thus settles out at 6, and can be withdrawn through discharge line 7. The fluid slurry containing the free protein fibers overflows through line 8 and is sent to centrifuge 9. Most desirably the discharge end of chute 2 inside of tank 3 is appreciably below the inlet end of overflow line 8 so that the relative tranquility of the surface of the body of fluid fat 4 at the level of the overflow is not significantly disturbed by the issuance of a stream of bone particles from the chute into the fat. The fiber concentration in line 8 is about 4 wt. percent. In centrifuge 9 the free protein is separated through line 11 from the liquid fat medium which is withdrawn through line 10 and can be reutilized in the operation.

Example 1

101.5 pounds of chicken fat were added to 100 pounds of chicken necks and backs which were a mixture of skins, attached meat and bones. The average composition of the raw material was 23.5 wt. percent chicken fat, 48 wt. percent water and 18.5 wt. percent protein and other solids. This feed was ground in a Rietz Disintegrator using a screen having $\tfrac{5}{16}$-inch holes. This mixture, after dehydration, was treated as taught in the preceding description. The yield of free protein, plus meat protein, on a fat and water free basis was 13.5 pounds and 4.8 pounds of mineral matter-bound protein on the same basis.

CONCLUSION

The free protein coming from pure bone matter, possibly from marrow and other constituents of the bone, is a valuable product which can be used for edible meat purposes such as components of sausage, meatloaf, hamburgers, etc., as well as a valuable raw material for the manufacture of soup stock, since it has a concentration of flavors that can be generated in cooking operation. Since it represents a concentrated form of all of the high grade meat values, of the bone in an amount of approximately 10% of the original bone this becomes a valuable concentrate, and further since it is a dry product can be stored and transported as a most valuable item of commerce in the edible meat by-product industry.

The mineral-bound protein matter combination also can be stored effectively and utilized for its gelatin values, thereby recovering its mineral matter value as well; or it can be utilized as an animal feed mineral concentrate rich in calcium, phosphorous and protein values.

The advantages of the process of this invention are apparent; an efficient manner of obtaining useful high quality products is provded. The process lends itself to continuous operation and few losses are encountered. It is to be understood that this invention is not limited to the specific examples which have been offered simply as illustrations, and that modifications may be made without departing from the spirit of the invention. Thus protection by Letters Patent of this invention in all its aspects as the same are set forth in the appended claims is sought to the broadest extent that the prior art allows.

What is claimed is:

1. A process for separating and recovering free protein and mineral matter-bound protein contained in ground bone particles, which consists essentially of agitating the ground bone feed dispersed in a liquid fat medium with the intensity of agitation being such that the lighter free protein is suspended while the heavier mineral matter-bound protein settles out; withdrawing a mixture of liquid fat and suspended free protein, and withdrawing the settled-out mineral matter-bound protein.

2. The process of claim 1 in which the bone feed to the liquid fat medium is substantially uncooked.

3. The process of claim 2 in which the bone feed is first subjected to dehydration.

4. A process for spearating and recovering free protein and mineral matter-bound protein contained in ground bone particles of a size such that at least 90 wt. percent have a particle size of less than about .015 cu. in., which comprises injecting the bone particles into an agitated body of liquid fat medium which is at a temperature in the range of about 100° to 300° F., the agitated fat velocity being sufficient to suspend the lighter free protein while the heavier mineral matter-bound protein settles out and recovering the free protein in the liquid fat medium freed substantially of the mineral matter-bound protein.

5. As a product a free protein prepared by agitating substantially uncooked and previously dehydrated ground bone particles in a liquid fat medium with an intensity of agitation such that the lighter free protein contained in said particles is suspended while the heavier mineral matter-bound protein contained therein settles out; withdrawing a mixture of liquid fat and suspended free protein, and separating the free protein from the liquid fat in the withdrawn mixture.

References Cited

UNITED STATES PATENTS

| | | | |
|---|---|---|---|
| 781,880 | 2/1905 | Hunter | 260—123.7 |
| 878,930 | 2/1908 | Berliner | 260—412.8 |
| 1,761,362 | 6/1930 | Pansky | 260—118 |
| 2,635,104 | 4/1953 | Chayen | 260—412.6 |
| 3,345,353 | 10/1967 | Klubien | 260—112 |

FOREIGN PATENTS

| | | |
|---|---|---|
| 148,161 | 7/1921 | Great Britain. |
| 775,003 | 5/1957 | Great Britain. |

OTHER REFERENCES

Principles of Biochemistry, Mathews, 1936, page 401, applicant's non-patent citation of record in the file of parent case 365,605.

A textbook of histology, Jordan, 1947, pp. 72—73, applicants non-patent citation of record in parent file.

Introduction to physiological chemistry, 1938, Bodansky, p. 625, applicant's non-patent citation of record in parent case.

WILLIAM H. SHORT, Primary Examiner

HOWARD SCHAIN, Assistant Examiner

U.S. Cl. X.R.

99—2, 18, 107, 108, 109, 124; 260—118, 412, 412.6

UNITED STATES PATENT OFFICE
CERTIFICATE OF CORRECTION

Patent No. 3,539,549　　　　　　　　Dated November 10, 1970

Inventor(s) Charles Greenfield

It is certified that error appears in the above-identified patent and that said Letters Patent are hereby corrected as shown below:

Column 1, first line of normal text: for "appaartus" read --apparatus--. Column 1, twenty-second line from bottom: for "exceesive" read --excessive--. Column 1, twelfth line from bottom: for "iself" read --itself--. Column 2, line 23: delete the comma between "matter-bound" and "fraction". Column 4, line 48: for "48" read --58--. Column 6, line 28: for "A textbook of histology" read --A Textbook of Histology--. Column 6, line 30: for "Introduction to physiological chemistry" read --Introducti to Physiological Chemistry--.

SIGNED AND SEALED

FEB 23 1971

(SEAL)
Attest:

Edward M. Fletcher, Jr.
Attesting Officer

WILLIAM E. SCHUYLER, JR.
Commissioner of Patents